United States Patent [19]

Nakamura et al.

[11] Patent Number: 4,805,714
[45] Date of Patent: Feb. 21, 1989

[54] POWER STEERING SYSTEM WITH HYDRAULIC REACTION

[75] Inventors: Keiichi Nakamura, Kariya; Susumu Honaga, Aichi; Mikio Suzuki, Hekinan; Hiroshi Kawakami, Toyota, all of Japan

[73] Assignee: Toyoda Koki Kabushiki Kaisha, Kariya, Japan

[21] Appl. No.: 3,766

[22] Filed: Jan. 16, 1987

[30] Foreign Application Priority Data

Jan. 16, 1986 [JP] Japan ................................. 61-5132

[51] Int. Cl.$^4$ .............................................. B62D 5/06
[52] U.S. Cl. ...................... 180/141; 91/371; 91/375 A; 91/434; 180/142
[58] Field of Search ............... 180/141, 142, 143, 132; 91/370, 371, 372, 375 A, 434

[56] References Cited

U.S. PATENT DOCUMENTS

| | | | |
|---|---|---|---|
| 3,855,904 | 12/1974 | Jablonsky | 91/372 X |
| 3,922,953 | 12/1975 | Strauff | 91/371 |
| 4,154,317 | 5/1979 | Nishikawa et al. | 180/143 |
| 4,293,051 | 10/1981 | Nishikawa | 180/143 X |
| 4,593,783 | 6/1986 | Honaga et al. | 180/141 |
| 4,605,085 | 8/1986 | Honaga et al. | 180/143 |
| 4,644,846 | 2/1987 | Kozuka | 180/142 X |
| 4,676,334 | 6/1987 | Nakamura et al. | 180/142 |

FOREIGN PATENT DOCUMENTS

| | | |
|---|---|---|
| 60-240569 | 11/1985 | Japan . |
| 61-44364 | 3/1986 | Japan . |
| 61-44365 | 3/1986 | Japan . |
| 61-218481 | 9/1986 | Japan . |

Primary Examiner—David M. Mitchell
Assistant Examiner—Charles R. Watts
Attorney, Agent, or Firm—Oblon, Fisher, Spivak, McClelland & Maier

[57] ABSTRACT

A power steering system which includes a fluid source that supplies pressure fluid of a constant flow rate, a fluid motor for supplementing manual steering torque, a servo-valve for distributing fluid to the fluid motor, and a reaction device for applying hydraulic reaction or feeling to a steering wheel. A magnetic control valve is connected to the reaction device to control fluid pressure applied thereto in accordance with a vehicle operating condition, such a vehicle speed. A flow dividing valve serves to divide the pressure fluid of a constant flow rate in a predetermined ratio into first and second flows which are respectively directed to the servo-valve and reaction device. A bypass conduit provided with a bypass orifice is connected between the fluid source and the servo-valve in parallel relation with the flow dividing valve.

3 Claims, 5 Drawing Sheets

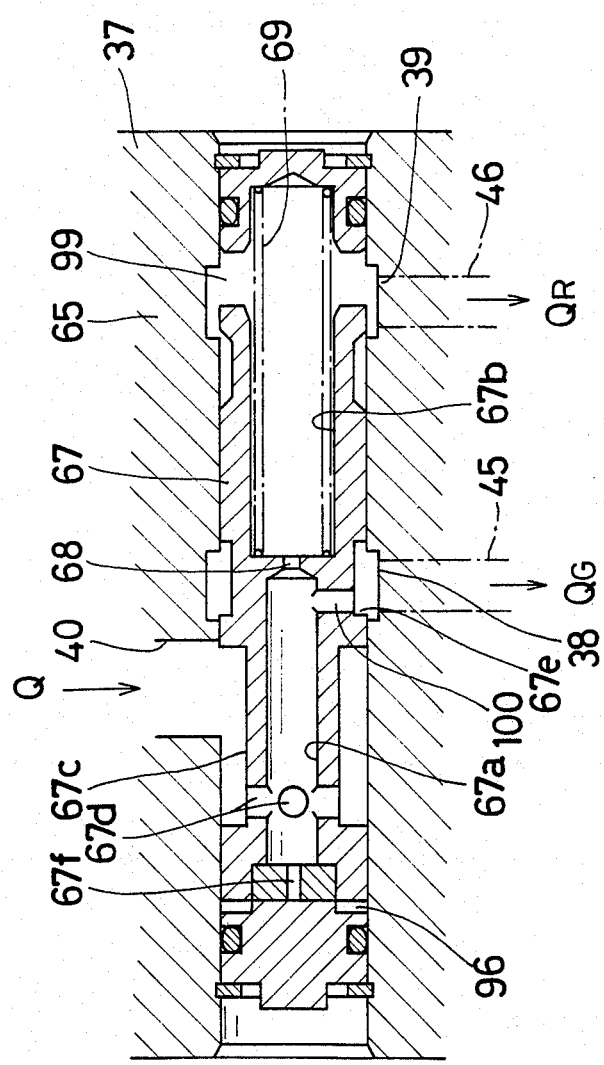

POWER STEERING SYSTEM WITH HYDRAULIC REACTION

BACKGROUND OF THE INVENTION

1. Field of the Invention

The present invention relates to a power steering system wherein power assistance derived therefrom will be modulated according to a vehicle operating condition such as vehicle speed.

2. Description of the Prior Art

In maneuvering a steering wheel of an automotive vehicle, it is recognized that power assistance at high vehicle speeds may desirably be less than at low speeds to allow for stabilization of the steering wheel at high speeds.

A power steering system with the above-mentioned steering characteristics is known having a reaction device which in accordance with fluid pressure supplied thereto provides resistance against relative rotation between valve elements of a servo-valve. The servo-valve controls fluid flow to and from a fluid motor according to the relative rotation between the valve elements, which, in turn, generates the power assistance. The fluid pressure supplied to the reaction device is controlled by a solenoid-operated control valve at a low level when high power assistance is necessary at low vehicle speeds, and on the contrary, at a high level when less power assistance is required at high vehicle speeds.

Conventionally, a flow dividing valve is provided to divide pressure fluid from a pump in accordance with a predetermined ratio into a first fluid flow directed to the servo-valve and a second fluid flow directed to the reaction device.

In the event, however, where a spool valve of the flow dividing valve is locked due to the existence of a foreign particle, for example, between the spool and cylinder of the flow dividing valve, so as to block the outlet port of the flow dividing valve which is connected to the servo-valve, the entire pressure fluid from the pump is directed to the reaction device. As a result, the pressure of the fluid derived from the pump rises to the threshhold value of pressure of a relief valve connected to the pump even when the servo-valve is sustained at a neutral position because the excess fluid flow is throttled by an orifice of the flow dividing valve and the solenoid-operated control valve. Accordingly, there is concern that seizure occurs in the pump so as to cause a breakdown of the power steering system.

SUMMARY OF THE INVENTION

It is therefore an object of the present invention to provide a power steering system with hydraulic reaction, wherein the pressure of fluid derived from a fluid source is prevented from increasing to a threshhold value of a relief valve while a servo-valve is sustained at a neutral position.

Another object of the present invention is to provide a power steering system with hydraulic reaction, wherein by use of a simple and relatively inexpensive construction, the entire fluid derived from a fluid source is prevented from being directed to a reaction device.

Briefly, according to the present invention, these and other objects are achieved by providing a power steering system with hydraulic reaction including fluid source means for supplying pressure fluid of a constant flow rate, a fluid motor, a servo-valve for distributing pressure fluid to said fluid motor in accordance with relative rotation between input and output shafts, reaction means for providing resistance against relative rotation between input and output shafts, magnetic control valve means for controlling fluid pressure applied to the reaction means in accordance with vehicle operating condition, flow dividing valve means for dividing the pressure fluid from the fluid source means in accordance with a predetermined ratio into a first fluid flow directed to the servo-valve and a second fluid flow to the reaction means, and a bypass conduit provided with a bypass orifice therein and connected between the fluid source means and the servo-valve means in parallel relation with said flow dividing valve means.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 6 is a longitudinal sectional view of a second embodiment of the flow dividing valve incorporating the bypass conduit provided with the bypass orifice.

DESCRIPTION OF THE PREFERRED EMBODIMENTS

Figure 1:
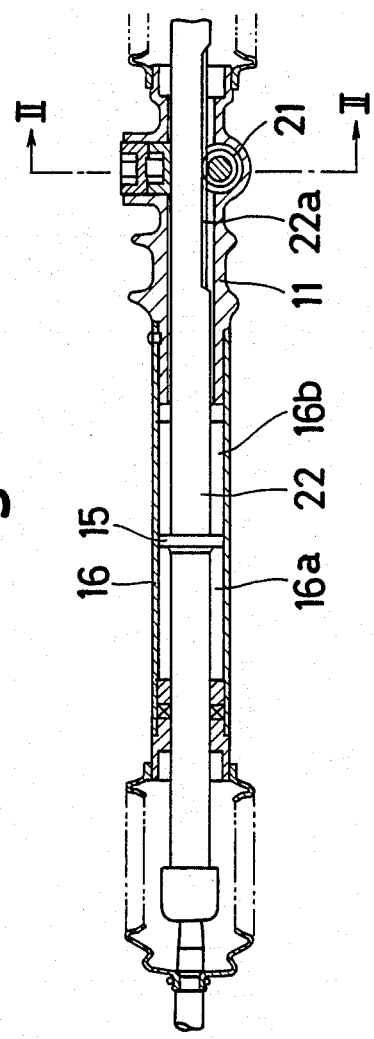
FIG. 1 is a longitudinal section view of a power steering system according to the present invention.

Referring to the drawings and to FIG. 1 in particular, reference numeral 11 designates a gear housing that is fixedly mounted on a chassis of an automotive vehicle. A steering rod 22 is slidably mounted on gear housing 11, with opposite ends thereof extending outwardly from gear housing 11. Respective ends of steering rod 22 are connected to steerable wheels of the vehicle by way of a conventional steering link mechanism. A piston 15 of a fluid motor is fixedly attached to a middle portion of steering rod 22 and is slidably accommodated in a cylinder tube 16 that is unitarily connected to gear housing 11.

Figure 2:
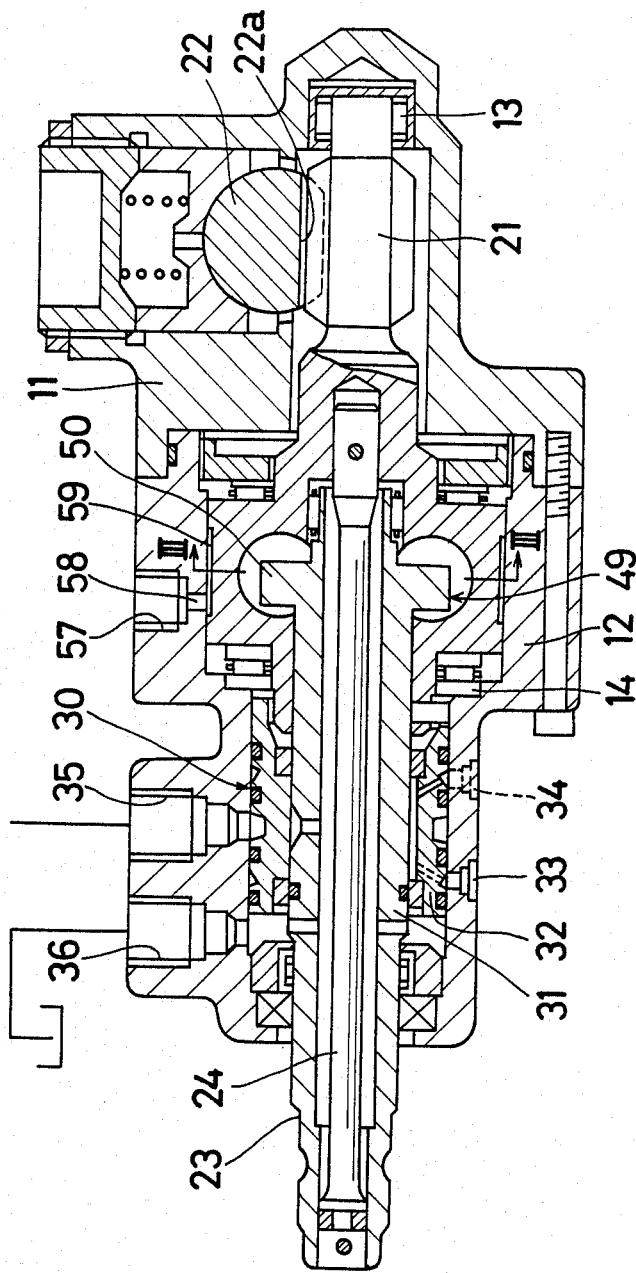
FIG. 2 is an enlarged sectional view taken along line II—II of FIG. 1.

Referring now to FIG. 2, valve housing 12 is fixedly attached to gear housing 11. An output shaft 21 is rotatably journaled to gear housing 11 and valve housing 12 by means of a pair of bearings 13, 14 in perpendicular relation with steering rod 22. A pinion is provided on output shaft 21 and is engaged with a rack 22a which is formed on steering rod 22.

Valve housing 12 accommodates servo-valve 30 which comprises a sleeve valve member 32 and a rotary valve member 31. Sleeve valve member 32 is rotatably housed in valve housing 12 in coaxial relation with output shaft 21. Rotary valve member 31 is formed on an input shaft 23 which is connected to a steering wheel. Input shaft 23 is flexibly connected to output shaft 21 by means of a torsion bar 24. A plurality of axially extending slots (not shown) are formed on an internal surface of sleeve valve member 32 and on a circumferential surface of rotary valve member 31 at regular intervals. Thus, according to the relative rotation between sleeve valve member 32 and rotary valve member 31, a supply port 35 communicates with one of cylinder ports 33, 34 which are respectively in fluid communication with left and right chambers 16a, 16b of the fluid motor, and an exhaust port 36 communicates with the remaining port of cylinder ports 33, 34. Sleeve valve member 32 is connected to the inner end of output shaft 21 with a spline engagement.

Figure 3:
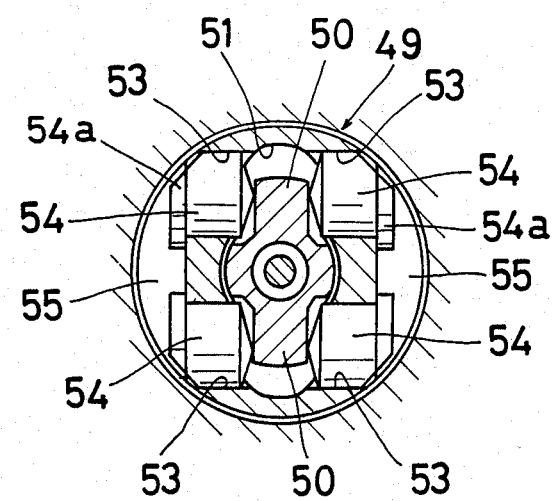
FIG. 3 is a cross-sectional view taken along line III—III of FIG. 2.

FIG. 2 and 3 show in detail the construction of a reaction device 49. The interior end of input shaft 23 is provided with a pair of radial projections 50 which are received with a predetermined clearance within respective recesses 51 formed in a large diameter portion of output shaft 21, so as to allow relative rotation between input and output shafts 23, 21 by an angle of several degrees.

Two pairs of bores 53 are formed in the large diameter portion of output shaft 21, facing respective sides of respective radial projections 50. Plungers 54 are slidably received in respective bores 53 and are urged toward radial projections 50 by means of fluid pressure supplied to reaction chambers 55 which are formed in output shaft 21 and which accommodate the rear portion of plungers 54 therein. Forward movement of plungers 54 is limited by abutment of flanges 54a formed on plungers 54 at rear ends thereof with bottom surfaces of reaction chambers 55 so as to hold projections 50 at a central position. Fluid pressure controlled in accordance with vehicle operating condition such as vehicle speed is supplied to reaction chambers 55 by way of a port 57, a conduit 58 and an annular recess 59 formed on a periphery of the large diameter portion of output shaft 21.

Figure 4:
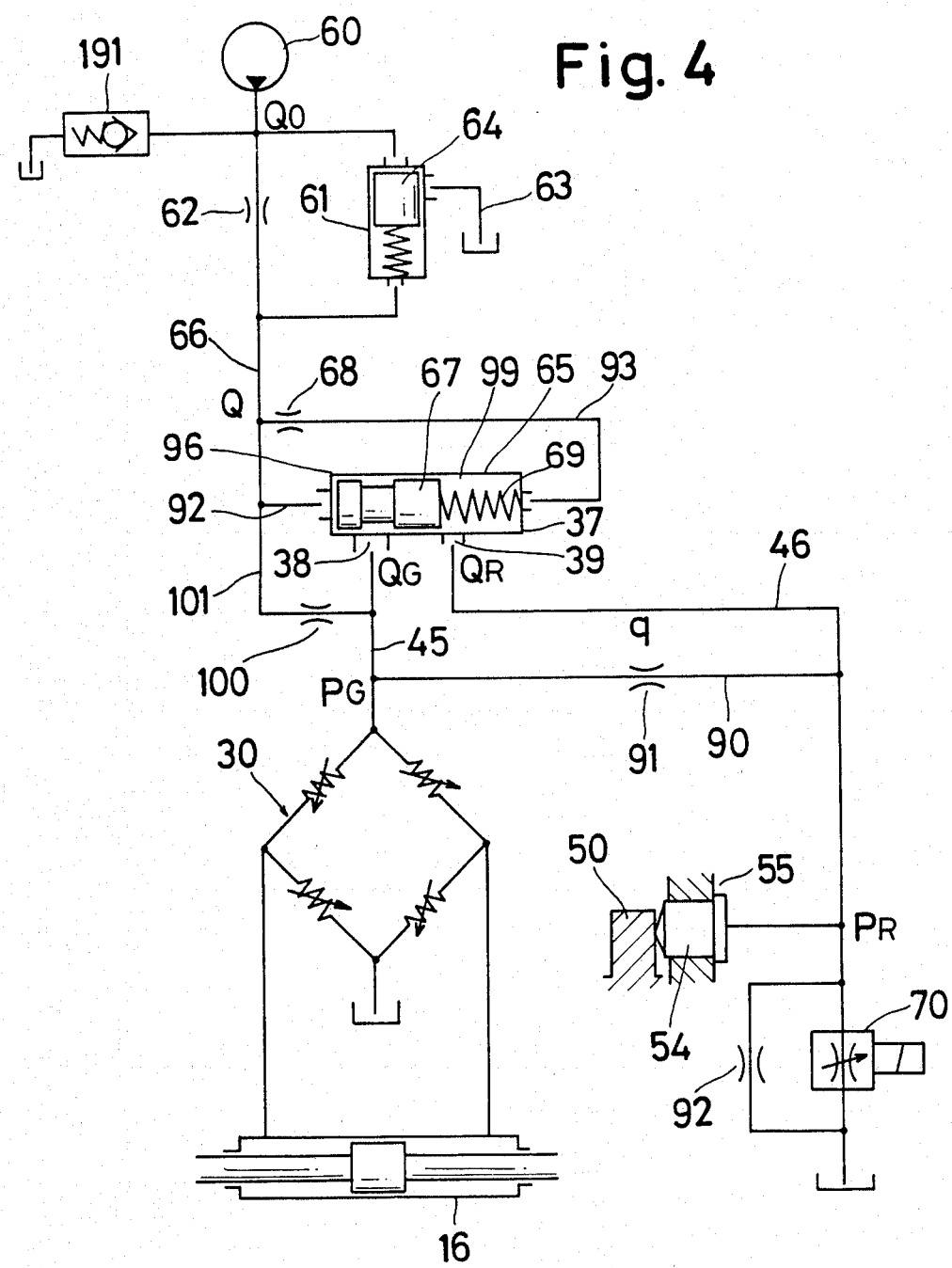
FIG. 4 is a diagrammatic view of the power steering system according to the present invention.

As shown in FIG. 4, reference numeral 60 designates a pump that is driven by an engine of the vehicle. An outlet port of pump 60 is connected to a flow control valve 61 which comprises a metering orifice 62 and a bypass valve spool 64 that is moved in accordance with the pressure differential across metering orifice 62 so as to keep the pressure differential constant. Thus, pressure fluid QO discharged from pump 60 is divided into pressure fluid Q of a constant flow rate flowing through metering orifice 62 and any existing excess flow led to a passage 63 according to the function of flow control valve 61. A conventional pressure relief valve 191 is connected to the outlet port of pump 60 to relieve excess pressure should such occur in the circuit. When pump 60 is driven by an electric motor with constant speed to discharge pressure fluid of a constant rate, flow control valve 61 is unnecessary.

A flow dividing valve 65 is connected to an outlet port of flow control valve 61 by way of a conduit 66. Flow dividing valve 65 includes valve casing 37 provided with first and second outlet ports 38, 39. A valve spool 67 is positioned in valve casing 37 and is movable so as to vary the opening areas of first and second outlet ports 38, 39 with respective land portions formed thereon in an inverse manner with respect to each other. Flow dividing valve 65 includes first and second flow paths 92, 93 which respectively connect conduit 66 to first and second outlet ports 38, 39 through the interior of valve casing 37. A metering orifice 68 is located in second flow path 93 while a spring 69 is accommodated in a rear chamber 99 of valve casing 37 and urges valve spool 67 in a direction to open second outlet port 39 and inversely to close first outlet port 38. First flow path 92 communicates with a front chamber 96 of valve casing 37 while orifice 68 communicates with rear chamber 99. Thus, valve spool 67 is urged against spring 69 by the pressure difference across orifice 68 to divide pressure fluid Q into first and second fluid flow QG, QR discharged from first and second outlet ports 38, 39. First and second outlet ports 38, 39 are respectively connected to servo-valve 39 and reaction chambers 55 by way of conduits 45, 46. A magnetic control valve 70 is connected to reaction chambers 55 so as to control fluid pressure PR applied to reaction chamber 55 in accordance with a vehicle operating condition such as vehicle speed.

Figure 5:
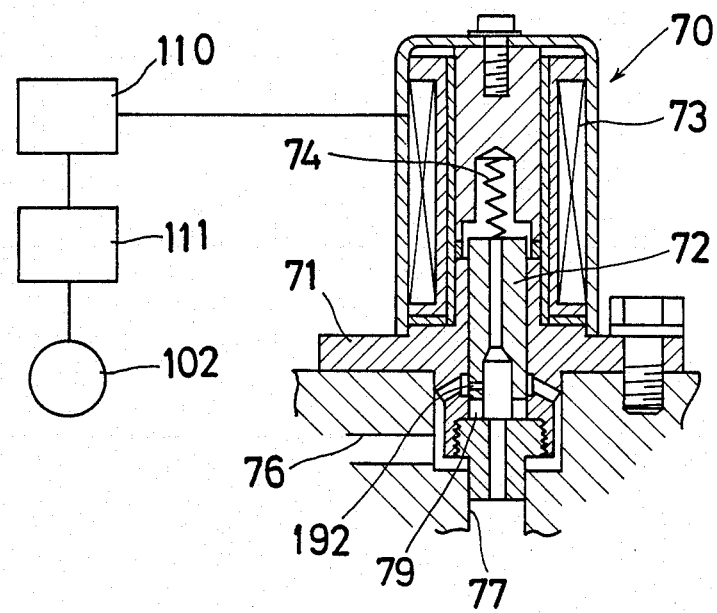
FIG. 5 is a longitudinal sectional view of the magnetic control valve shown in FIG. 4.

Referring now to FIG. 5, magnetic control valve 70 is provided with a valve body 71, a spool 72 slidably accommodated in valve body 71, and a solenoid 73 secured to valve body 71. Spool 72 is urged by a spring 74 to a downward end position where passages 76, 77 which are respectively connected to reaction chambers 55 and a reservoir communicate with each other through an orifice 192 formed in spool 72. Solenoid 73 is connected to a solenoid drive circuit 110 which in turn is controlled by a computer 111. Accordingly, solenoid drive circuit 110 generates current I in accordance with a signal proportional to vehicle speed V generated from a conventional speedometer 102. A slit 79 is formed at the bottom end portion of spool 72 so that when spool 72 is lifted up against spring 74 upon excitation of solenoid 73, passages 76 and 77 communicate with each other through slit 79. Control current I may be modulated with another vehicle operating condition such as load weight.

A bypass conduit 101 provided with a bypass orifice 100 is connected between flow control valve 61 and servo-valve 30 in parallel relation with flow dividing valve 65. Moreover, a conduit 90 provided with an orifice 91 is connected between first and second outlet ports 38, 39 of flow dividing valve 65. The sectional areas of metering orifice 68, bypass orifice 100 and orifice 91, as an example, respectively have the ratios 10:22:1.

Operation of the power steering system as described above will now be explained. Fluid flow QO discharged from pump 60 is divided into fluid flow QO of a constant rate, for example, of 8 l/min, and excess flow by flow control valve 61. Fluid flow Q is in turn divided into first fluid flow QG at a rate, for example, of 6.7 l/min, led to supply port 35 of servo-valve 30 and second fluid flow QR at a rate, for example, of 0.8 l/min, led to reaction device 49 by flow dividing valve 65. The remaining fluid flow of a rate, for example, of 0.5 l/min, is led to servo-valve 30 through bypass conduit 101. At a low vehicle speed, since a relatively large current I is supplied to solenoid 73 of magnetic control valve 70, spool 72 is lifted up to open the slit to a maximum degree. Therefore, a second fluid flow QR is drained to reservoir without substantial restriction, reaction fluid pressure PR is hardly generated in reaction chambers 55. Thus, when input shaft 23 is turned according to manual maneuvering of the steering wheel, plungers 54 are easily retracted, resulting in easy relative rotation between sleeve valve member 32 and rotary valve member 31 in usual power assisted steering operation so as to increase the fluid pressure PG supplied to fluid motor 16.

As current I supplied to solenoid 73 decreases in accordance with the increase in vehicle speed, spool 72 is proportionately moved downward by spring 74 so as to close slit 79. Thus, second fluid flow QR is throttled so as to increase reaction fluid pressure PR, and, accordingly, plungers 54 offer resistance to the rotation of projections 50. Such resistance increases the manual torque which is necessary to generate relative rotation between sleeve valve member 32 and rotary valve member 31 and, as a result, produces less power assistance at high vehicle speeds than at low vehicle speeds. Moreover, restricted fluid flow by orifice 91 is led to conduit 46 through conduit 90 when the fluid pressure PG supplied to fluid motor 16 increases in accordance with manual maneuvering of the steering wheel. Accordingly, when spool 72 is moved downward to close slit 79, the fluid flow through conduit 90 into conduit 46 causes an additional pressure increase in reaction fluid pressure PR so as to communicate to a driver a feel of more definite resistance in turning the steering wheel at high vehicle speeds.

Even if valve spool 67 of flow dividing valve 65 is locked due to the existence of a foreign particle so as to block first outlet port 38, a portion of pressure fluid Q of a constant flow rate from flow control valve 61 can flow through orifice 100 into servo-valve 30 to avoid the entire pressure fluid Q from being directed to orifice 68. Accordingly, fluid pressure derived from the pump 60 does not rise to the threshhold relief pressure setting of relief valve 91 while the steering wheel is maintained at a neutral position and, as a result, problems with the pump such as seizure can be effectively prevented.

Another example of flow dividing valve 65 is shown in FIG. 6, wherein bypass conduit 101 provided with bypass orifice 100 is incorporated therein. Valve casing 37 is provided with an inlet port 40 which is connected to flow control valve 61 by way of conduit 66. A groove 67c is formed on a periphery of valve spool 67 so as to connect inlet port 40 to first outlet port 38 when valve spool 67 is moved against spring 69. In valve spool 67 there is formed axial holes 67a, 67b which communicate with each other through metering orifice 68 formed in the middle portion of valve spool 67. Axial hole 67a communicates with groove 67c through radial holes 67d while axial hole 67b opens into rear chamber 99 to connect inlet port 40 to second outlet port 39 through orifice 68. A groove 67e is formed on a periphery of valve spool 67, facing first outlet port 38. Bypass orifice 100 is formed in valve spool 67 to connect axial hole 67a with groove 67e. Axial hole 67a is connected to front chamber 96 of valve casing 65 by way of orifice 67f to introduce fluid pressure upstream orifice 68 into front chamber 96 with a damping effect. Now, inlet port 40 and groove 67c correspond with first flow path 92 in the first embodiment, inlet port 40, groove 67c radial holes 67d, axial hole 67a, metering orifice 68, axial hole 67h and rear chamber 99 correspond with second flow path 93, and inlet port 40, groove 67c, radial holes 67d, axial hole 67a bypass orifice 100, groove 67e and first outlet port 38 correspond with bypass conduit 101 provided with bypass orifice 100.

Although in the above-described embodiments, reaction device 49 is constructed such that a pair of radial projections 50 are formed on input shaft 23, and two pairs of plungers are slidably received in output shaft 21 and are urged toward the respective sides of projections 50 by the fluid pressure so as to provide resistance against relative rotation between input and output shafts 23, 21, the same effect as in the above-described embodiments can be obtained in the case where plungers are radially slidably received in output shaft 21 and are urged by the fluid pressure toward V-shaped grooves which are axially formed on the periphery of input shaft 23, or in another case where plungers are axially slidably received in output shaft 21 and are urged by the fluid pressure toward V-shaped grooves which are radially made on a flange portion of input shaft 23.

Further, although in the above-described embodiments, in order to control fluid pressure PR applied to reaction chamber 55, the opening area of slit 79 of magnetic control valve is varied in accordance with vehicle operating conditions, a conventional magnetic pressure control valve which controls relief pressure in conduit 46 in accordance with vehicle operating conditions can be substituted for magnetic control valve 70.

Obviously, numerous modifications and variations of the present invention are possible in light of the above teachings, it is therefore to be understood that within the scope of the appended claims, the invention may be practiced otherwise than as specifically described herein.

What is claimed as new and desired to be secured by Letters Patent of the United States is:

1. A power steering system which utilizes fluid source means for supplying pressure fluid of a constant flow rate and fluid motor means for supplementing manual steering torque, comprising:

a valve housing;

a rotatable output shaft partially positioned within said valve housing and operatively connected with said fluid motor;

a rotatable input shaft partially positioned within said valve housing, aligned with said output shaft and adapted for manual actuation;

servo-valve means located in said valve housing for distributing fluid flow to said fluid motor in accordance with relative rotation between said input and output shafts;

reaction means located in said valve housing for providing resistance against relative rotation between said input and output shafts in accordance with fluid pressure supplied thereto;

magnetic control valve means connected to said reaction means for controlling fluid pressure applied thereto in accordance with a vehicle operating condition;

flow dividing valve means including a valve casing having first and second outlet ports, a spool movable in said valve casing so as to vary opening areas of said first and second outlet ports in an inverse manner with respect to each other, first flow path means for connecting said fluid source means to said first outlet port through the interior of said valve casing; second flow path means for connecting said fluid source means to said second outlet port through the interior of said valve casing; a metering orifice located in said second flow path means; and biasing means for urging said spool in a direction so as to open said second outlet port, said spool being urged against said biasing means by the pressure difference across said metering orifice, said first outlet port being connected to said servo-valve means and said second outlet port being connected to said reaction means;

a bypass conduit provided with a bypass orifice therein and connected between said fluid source means and said servo-valve means in parallel relation with said flow dividing valve means; and a conduit provided with an orifice therein and connected between said first and second outlet port.

2. A power steering system which utilizes fluid source means for supplying pressure fluid of a constant flow rate and a fluid motor means for supplementing manual steering torque, comprising:

a valve housing;

a rotatable output shaft partially positioned within said valve housing and operatively connected with said fluid motor;

a rotatable input shaft partially positioned within said valve housing, aligned with said output shaft and adapted for manual actuation;

servo-valve means located in said valve housing for distributing fluid flow to said fluid motor in accordance with relative rotation between said input and output shafts;

reaction means located in said valve housing for providing resistance against relative rotation between said input and output shafts in accordance with fluid pressure supplied thereto;

magnetic control valve means connected to said reaction means for controlling fluid pressure applied thereto in accordance with a vehicle operating condition;

flow dividing valve means including a valve casing having an inlet port connected to said fluid source and first and second outlet ports; a spool movable in said valve casing so as to vary opening areas of said first and second outlet ports in an inverse manner with respect to each other; biasing means for urging said spool in a direction so as to open said second outlet port; a groove formed on a periphery of said spool to communicate said inlet port with said first outlet port when said spool is moved against said biasing means; a passage formed in said spool and opening at one end thereof into said groove and at another end thereof onto a rear end of said spool to communicate said inlet port with said second outlet port; and a metering orifice formed in said passage, said spool being urged against said biasing means by the pressure difference across said metering orifice, said first outlet port being connected to said servo-valve means and said second outlet port being connected to said reaction means; and bypass orifice means formed in said spool for communicating said inlet port with said first outlet port in parallel relation with said flow dividing valve means.

3. A power steering system as set forth in claim 2, further comprising a conduit provided with an orifice therein and connected between said first and second outlet ports.

* * * * *